US005426422A

United States Patent [19]

Vanden Heuvel et al.

[11] Patent Number: 5,426,422

[45] Date of Patent: Jun. 20, 1995

[54] METHOD AND APPARATUS FOR QUICK ACCESS TO SELECTED UPDATED INFORMATION IN A SELECTIVE CALL RECEIVER

[75] Inventors: Dean P. Vanden Heuvel, Chandler; Craig Halley, Mesa, both of Ariz.

[73] Assignee: Motorola, Inc., Schaumburg, Ill.

[21] Appl. No.: 226,098

[22] Filed: Apr. 11, 1994

Related U.S. Application Data

[63] Continuation of Ser. No. 881,007, May 8, 1992, abandoned.

[51] Int. Cl.[6] .......................... H04Q 7/00; H04M 1/27

[52] U.S. Cl. .......................... 340/825.270; 340/825.44; 340/825.26; 379/354

[58] Field of Search ........... 340/825.44, 311.1, 825.47, 340/825.48, 825.26, 825.27; 379/354

[56] References Cited

U.S. PATENT DOCUMENTS 4,197,526 4/1980 Levine et al. .................. 340/825.44
4,473,824 9/1984 Claytor ........................... 340/825.27
4,845,491 7/1989 Fascenda et al. .............. 340/825.44
4,982,423 1/1991 Muroi ................................ 379/354
5,087,905 2/1992 Kuramatsu et al. ............. 340/311.1
5,157,391 10/1992 Weitzen .......................... 340/825.44

FOREIGN PATENT DOCUMENTS 1-246994 10/1989 Japan .............................. 340/825.27
2219423 12/1989 United Kingdom ........... 340/825.27

*Primary Examiner*—Donald J. Yusko
*Assistant Examiner*—Edward Merz
*Attorney, Agent, or Firm*—Kelly A. Gardner; John H. Moore

[57] ABSTRACT

A selective call receiver (30) receives personal messages and information services provided database messages. A memory (44) stores the personal messages in a first portion (46) and the database messages as a plurality of screens in a second portion (48). A display (42) displays the plurality of screens for the user's perusal. The user can display the screens manually through activation of user input controls (40) when operating in a database mode under the control of a controller (52). Alternatively, the user can display selected screens in a quick access or quick view mode by placing operation of the receiver (30) under the control of a quick view controller (60) coupled to the database portion of memory (48) and the display (42). The user can selectively flag a screen (FIG. 9) or trigger a numeric field of a screen (FIG. 16) via activation of user input controls (40) when operating in a database mode under the control of a controller (52). When database messages are received which update a flagged screen or triggered screen, the flagged or triggered screen automatically becomes one of the selected screens for display in the quick view mode.

15 Claims, 13 Drawing Sheets

METHOD AND APPARATUS FOR QUICK ACCESS TO SELECTED UPDATED INFORMATION IN A SELECTIVE CALL RECEIVER

This is a file wrapper continuing application under 37 CFR 1.62, of prior application Ser. No. 07/881,007 filed on May 8, 1992 by VandenHeuvel et al. for "Method and Apparatus for Quick Access to Selected Updated Information In A Selective Call Receivers", now abandoned.

CROSS REFERENCE TO RELATED, COPENDING APPLICATION

Related, copending applications are patent application 08/226,100, filed concurrently herewith, by Charles Ganucheau, Dean P. Vanden Heuvel, Craig Halley, Kyong Mun, and Patrick Dumstorff, and assigned to the assignee hereof, entitled "Method and Apparatus for User Selectable Quick Data Access in a Selective Call Receiver"; and patent application 07/880,819, filed concurrently herewith, by Dean P. Vanden Heuvel, Craig Halley, and Charles Ganucheau, and assigned to the assignee hereof, entitled "Method and Apparatus for Data Driven Triggering in a Selective Call Receiver".

1. Field of the Invention

This invention relates in general to selective call receivers, and in particular to selective call receivers for receiving information services.

2. Background of the Invention

Selective call receivers are radio frequency receivers which selectively receive messages. Conventionally, a selective call receiver examines a selective call signal to determine whether the receiver has been addressed. When an address assigned to the receiver is detected, the selective call receiver decodes a selective call message. The user is alerted that a message has been received and the message can thereafter be presented, either as a voice message or a numeric or alphanumeric displayed message. The message may be displayed on a conventional display such as a liquid crystal display (LCD). It is desirable that selective call receivers be portable and, consequently, most selective call receivers have LCDs of limited size. Additionally, most selective call receivers have limited room for user input controls.

More recently, users of selective call receivers desire additional features, such as reception of information services, while maintaining the desire for small portable receivers. Information services are services which provide regularly updated messages, such as news services (UPI), financial services (Dow Jones Stock Reports), or sports services. One such information services selective call system is described in U.S. Pat. No. 4,845,491.

A user can subscribe to several information services and receive information on many topics. Each topic may consist of several screens (i.e. information capable of being displayed on the LCD at one time). To view a screen of information, the user manipulates the limited number of user input controls to reach the screen. This manipulation could consist of numerous activations of user controls. The information is updated regularly by selective call messages comprising update information. If the user is alerted each time one of the screens is updated, it is likely that the user would be continuously alerted. Conversely, if the user is not alerted when a screen is updated, the user would be unaware of changes in information which are of importance to the user. Further, if the user elects to be alerted of an update and misses the alert either by having the alert turned off or not having the receiver on or near the user's person when the alert is activated, the user has no way of knowing that an update of information has occurred.

Additionally, access to updated information poses the same difficulties as access to any screen of information. It is undesirable for the user to be forced to continuously manipulate the user controls to select screens of interest in order to view updated information.

Thus, what is needed is a method and apparatus for notifying the user of selected updates of information and for allowing a user quick access to the screen or screens of updated information.

SUMMARY OF THE INVENTION

A selective call receiver receives messages which update databases that have been previously stored, and the databases comprise a plurality of screens of information. A method for displaying information in the selective call receiver comprises the step of receiving a selective call message comprising update information and database information, wherein the database information specifies a database and a location within the specified database for storage of the update information. The method further comprises the steps of updating a portion of the specified database in response to the update information and determining whether a screen of information that includes the updated portion of the specified database has been previously flagged by a user to indicate that the screen is of special interest. Thereafter, the screen is added to a list of screens of special interest to the user if the screen has been flagged. The user can then activate a quick view mode of operation, wherein the list of screens, including, if it has been flagged, the screen that includes the updated portion, is accessible by a user in the quick view mode of operation in response to a fewer number of user activations of user keys than are required for the display of other screens that are not included in the list of screens.

A selective call receiver receives selective call messages, stores databases including a plurality of screens, and receives inputs via user keys. The selective call receiver includes receiving means for receiving a selective call message comprising update information and database information, wherein the database information specifies a database and a location within the database for storage of the update information. The selective call receiver further includes updating means for updating a portion of the specified database in response to the update information and flagging means for receiving signals by which a user can flag a screen to indicate that the screen is of interest. Determining circuitry determines whether a screen of information that includes the updated portion of the specified database has been previously flagged by a user, and a list of screens of special interest is then generated. The screen is added to the list of screens if the screen has been flagged. Control circuitry within the selective call receiver provides user activation of a quick view mode of operation, wherein each of the list of screens, including, if it has been flagged, the screen that includes the updated portion, is accessible by a user in the quick view mode of operation in response to a fewer number of user activations of user keys than are required for the display of other screens that are not included in the list of screens.

DETAILED DESCRIPTION OF THE INVENTION

Figure 1:
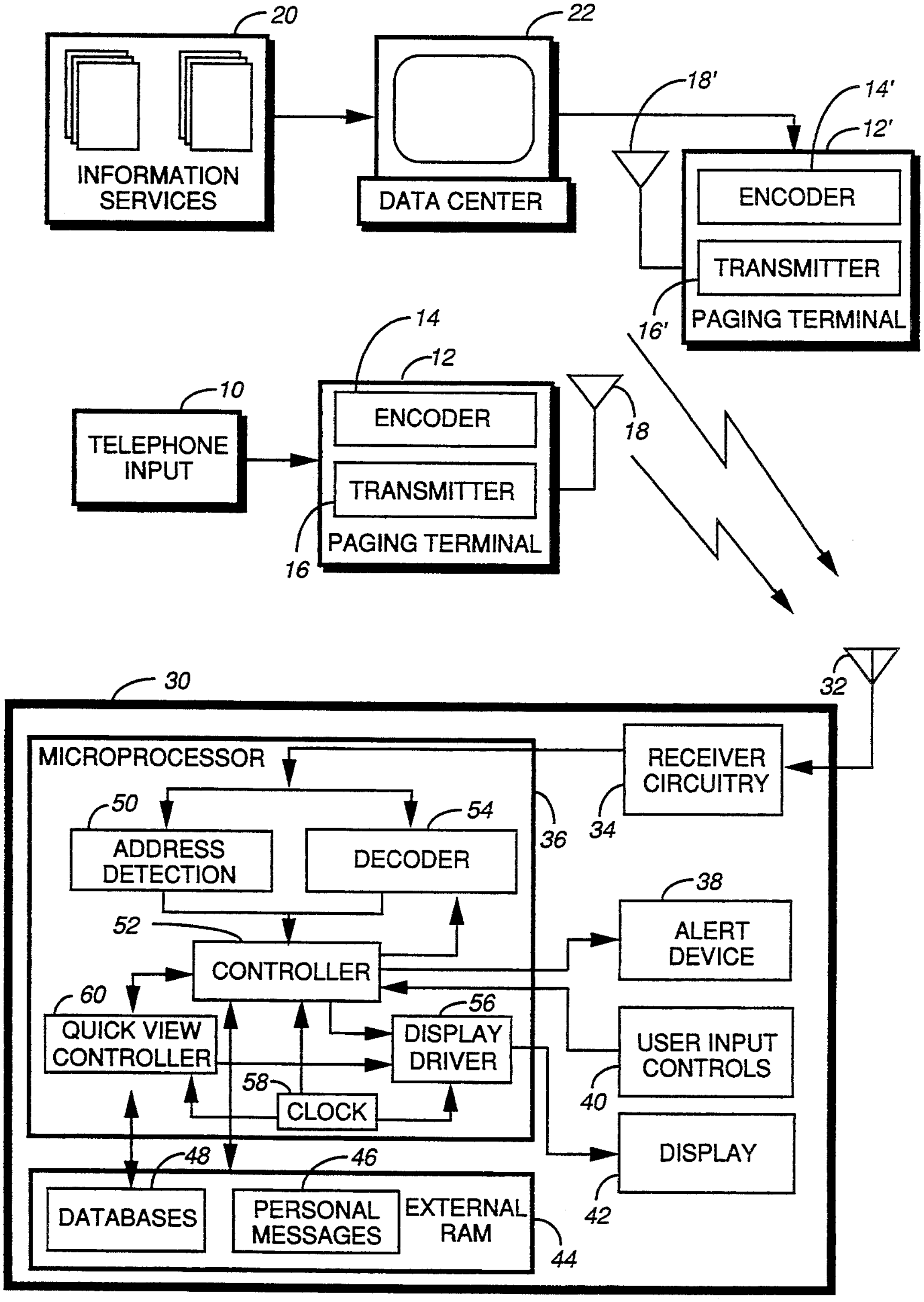
FIG. 1 is a block diagram of a selective call system in accordance with a preferred embodiment of the present invention.

Referring to FIG. 1, a selective call system in accordance with a preferred embodiment of the present invention transmits two types of signals: information services signals and personal message signals. As is well known to those skilled in the art, an originator of a personal selective call message inputs message information via a telephone input 10 to a paging terminal 12. The paging terminal 12 comprises an encoder 14 for encoding the message information into selective call signals and a transmitter 16 for transmitting the selective call signals via an antenna 18.

Information services signals are derived from information services 20 which compile information, e.g., financial, sports, news, etc., and forward the information to a data center 22. The data center 22 compiles the information provided by the information services 20 into appropriate messages which are provided to a paging terminal 12' for transmission as selective call signals therefrom. The paging terminal 12' similarly comprises an encoder 14', a transmitter 16', and an antenna 18'.

Thus, it can be seen that a selective call system in accordance with the preferred embodiment of the present invention broadcasts signals comprising personal messages and information services messages for reception by a receiver 30. The receiver 30 receives the selective call signals at an antenna 32 which generates electrical signals in response to the received radio frequency signals and forwards the signals to receiver circuitry 34 for demodulation. The demodulated signal is provided to a microprocessor 36 for processing thereby. The microprocessor 36 is coupled to an alert device 38, user input controls 40, and a display 42 for interfacing with a user of the selective call receiver 30. Additionally, the microprocessor 36 is coupled to an external random excess memory (RAM) 44 for storing information therein and for retrieving information therefrom. In accordance with the preferred embodiment of the present invention, the external RAM 44 has designated portions for storing personal messages 46 and for storing databases 48. The databases 48 are stored in a portion of the external RAM 44 in a manner which allows a user to access the information services data stored therein.

When a selective call signal is received and demodulated by the receiver circuitry 34, address detection block 50 of the microprocessor 36 examines the selective call signal to determine if an address assigned to the selective call receiver 30 is present within the signal. When an address assigned to the selective call receiver 30 is detected by the address detection block 50, a controller 52 is signaled to start a decoder block 54 decoding the received and demodulated selective call signal. The decoded signal is provided from the decoder block 54 to the controller 52 for processing thereby. The controller 52 stores the decoded selective call message in portions 46, 48 of the external RAM 44. The controller 52 thereafter provides a signal to the alert device 38 to alert the user that a selective call message has been received. Upon manipulation of the user input controls 40 by the user, the controller will provide the decoded selective call message to a display driver 56 for generation of a user readable display upon the display 42. A clock 58 is coupled to the controller 52 to provide conventional clocking functions allowing for proper operation of the controller 52 and the microprocessor 36.

The selective call receiver 30 is user operable in three modes in accordance with the preferred embodiment of the present invention: a personal message mode, a database mode, and a quick view mode. When operating in the personal message mode, the selective call receiver can function as a conventional pager whereby the user can manipulate the user input controls 40 to select and read various personal messages stored in the personal message portion 46 of the RAM 44. During database mode operation, the user can manipulate the user input controls 40 to select and read various screens of the databases stored in the database portion 48 of the RAM 44.

In accordance with the preferred embodiment of the present invention, quick view mode operation is a mode of operation for allowing a user quick access to selected screens under the control of a quick view controller 60. The quick view controller 60 is coupled to the controller 52 for controlling the operation of the microprocessor 36 when the user places the selective call receiver 30 into the quick view operation mode. The quick view operation mode involves either an automatic quick view mode wherein the quick view controller 60 automatically retrieves user selected screens from the database 48 and provides those screens sequentially to the display driver 56 for display upon the display 42 or a manual quick view mode wherein selected screens may be user selectably retrieved from the memory 48 for display without the user having to navigate through a database to the screen. The clock 58 is coupled to the quick view controller 60 for controlling the amount of time that each of the user selective screens are displayed upon the display 42.

Figure 2:
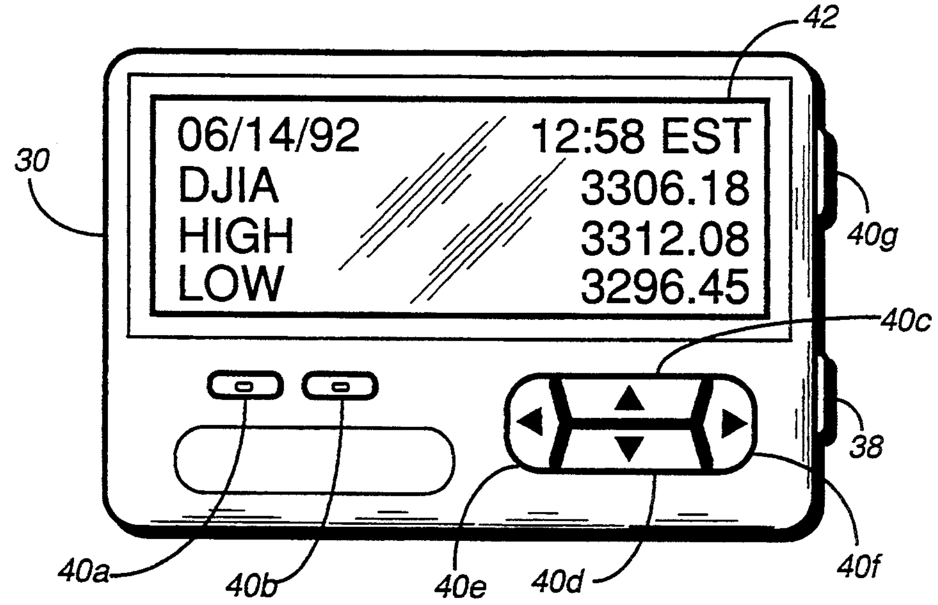
FIG. 2 is a planar view of the information services pager of FIG. 1 in accordance with the preferred embodiment of the present invention.

Referring next to FIG. 2, a preferred embodiment of the multi-function selective call receiver 30 of FIG. 1 is depicted. The user input controls 40 (FIG. 1) comprise a plurality of user activatable keys 40*a*, 40*b*, 40*c*, 40*d*, 40*e*, 40*f*, and 40*g*. The alert device 38 is a visual indicator, such as a light emitting diode (LED). An audible annunciator could also be mounted just inside the housing of the receiver 30 to operate in conjunction with the LED 38 for alerting the user.

Figure 3:
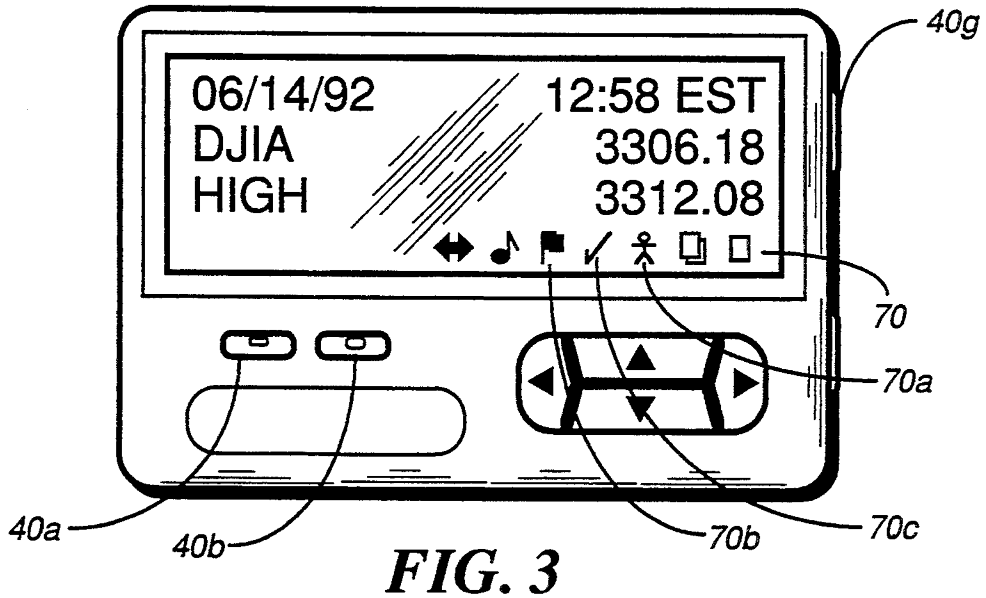
FIG. 3 is a planar view of the information services pager of FIG. 2 wherein a function menu overlays a screen of displayed information in accordance with the preferred embodiment of the present invention.

On the display 42 of FIG. 2, a typical database screen showing date information, time information, and financial stock information is shown. Referring to FIG. 3, upon activation of the function key 40*b*, the bottom line of the four line display 42 is overwritten with a function menu 70 showing a plurality of icons, each of the plurality of icons identifying a particular function. The left/-right cursor keys 40*e*, 40*f* allow the user to scroll among the various functions of the function menu 70 and to select one of the icons. Upon selection of the proper icon, e.g., 70*a*, 70*b*, or 70*c* the user depresses the function key 40*b* to activate that function. In accordance with the present invention, the user selects the man icon 70*a* to insert the displayed screen into the list of screens for quick view mode operation.

Figure 4:
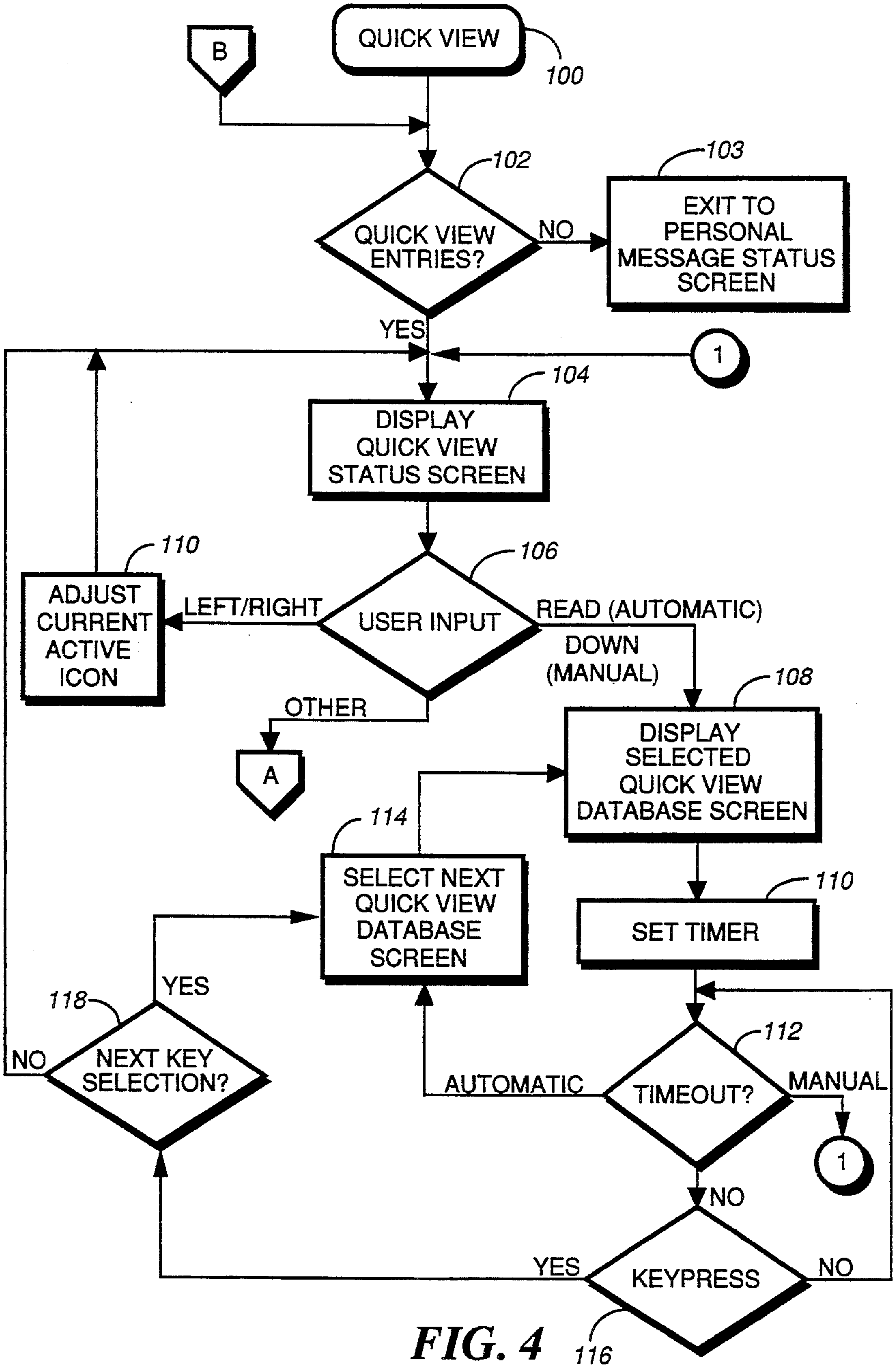
FIGS. 4 and 5 are a flow chart of a quick view mode of operation of the information services pager of FIG. 2 in accordance with the preferred embodiment of the present invention.

Referring to FIG. 4, the operation of the quick view controller 60 is shown as a quick view routine 100. Initially, it is determined 102 whether there are any entries (screens) assigned to the quick view mode. If there are no screens for quick view operation when the quick view mode is selected 100, the quick view controller 60 (FIG. 1) passes operation back to the controller 52 for display of the personal message status screen 103 and allows the user to select operations not essential to the operation of the present invention.

Figure 6:
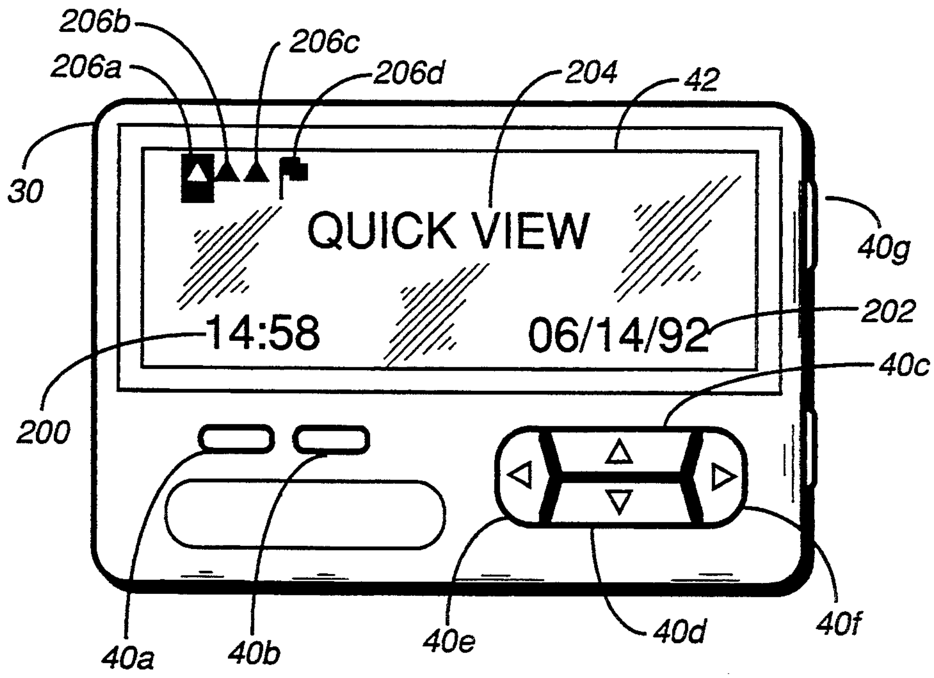
FIG. 6 is a planar view of the information services pager of FIG. 2 wherein the quick view status screen is displayed in accordance with the preferred embodiment of the present invention.

If there are quick view entries 102, then selection of the quick view mode prompts display of a quick view status screen 104, as shown in FIG. 6. The quick view status screen (FIG. 6) comprises time information 200, date information 202, and a message indicating activation of quick view mode 204 which may be personalized by the service provider. Additionally, selected screen icons 206*a*, 206*b* and 206*c* indicate that three screens have been preselected by the user for display during quick view operation. Flag-shaped screen icon 206*d* indicates that a fourth screen has automatically been inserted for quick view display in accordance with the present invention.

The highlighting of icon 206*a* indicates that the left most icon 206*a* is the current active icon. In accordance with the present invention, activation of the read key 40*a* or the down cursor key 40*d* as a user input 106 (FIG. 4) will cause display of the selected quick view database screen, which initially is the screen indicated by the current icon 206*a* (FIG. 6). To adjust the current active icon 109, the user activates the left cursor key 40*e* or the right cursor key 40*f* for movement left or right, respectively, among the screen indication icons 206*a*, 206*b*, 206*c*, and 206*d*.

When the first selected quick view database screen is displayed 108, a timer is set 110 in controller 60 (FIG. 1). By referencing the clock 58, the controller 60 controls the display of the selected screen for a predetermined time. The predetermined time is preferably user selectable. In manual quick view operation, when the timer times out 112, the display reverts 104 to the quick view status display (FIG. 6) and awaits user selection 106 of a next quick view database screen. In automatic quick view operation, when the timer times out 112, the quick view controller 60 (FIG. 1) automatically selects the next quick view database screen 114 by retrieving the screen from the database portion 48 of the memory 44 and providing it to the display driver 56 (FIG. 1). The display driver 56 causes the selected quick view screen to be displayed 108.

In either manual or automatic operation, if timeout has not occurred 112, the user can override timer control by a key press 116 on any of the user input controls 40 (FIG. 6). For example, the user may not wish to view one of the quick view screens for the predetermined amount of time set by the timer 110. Therefore, an appropriate key press 116, such as activation of a key indicating selection of the next screen 118, would cause operation to proceed to retrieval of the next screen 114 earlier than timeout 112 of the predetermined time set in the timer 110. Any other key pressed would take operation out of the quick view database screen mode and return operation to display of the quick view status screen 104.

Figure 5:
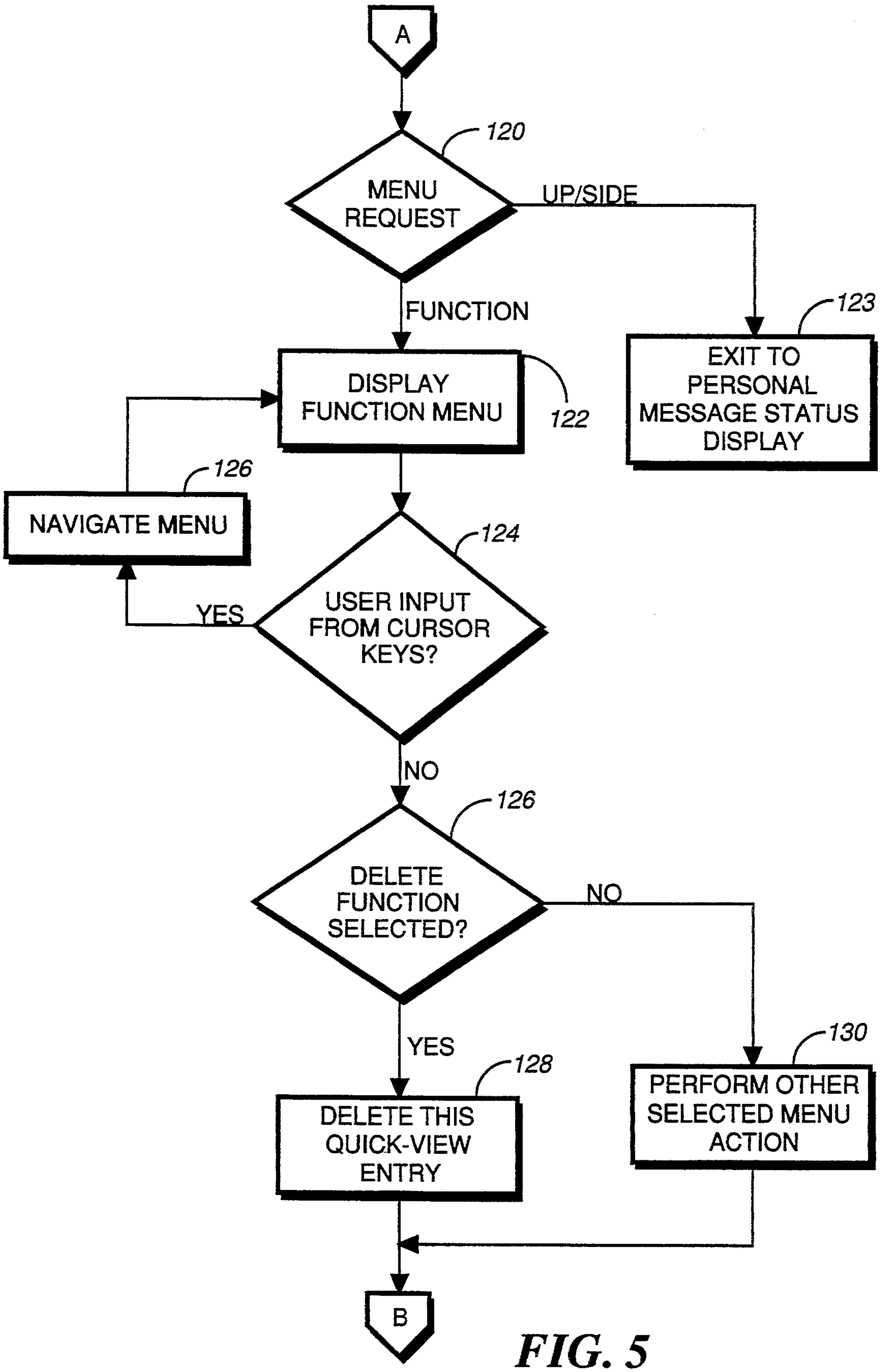
Figure 7:
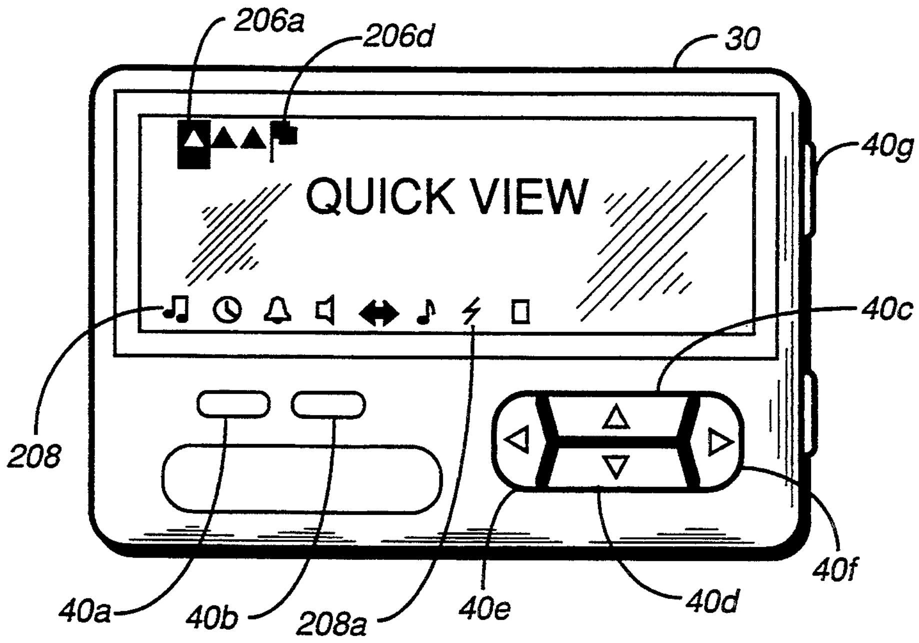
FIG. 7 is a planar view of the information services pager of FIG. 2 wherein the quick view status screen comprising a quick view function menu is displayed in accordance with the preferred embodiment of the present invention.

From the status screen 104, a user input 106 can request a quick view function menu 120 (FIG. 5). A menu request 120 is performed by activation of the function key 40*b* (FIG. 6) which causes display of a function menu. A quick view status screen function menu 208 is shown in FIG. 7. The function menu 208 comprises a plurality of icons which can be utilized to select various quick view functions. Referring back to FIG. 5, when the function menu is displayed 122 the quick view controller 60 (FIG. 1) looks for input from the left and right cursor keys 40*e* and 40*f*. The cursor keys can be used to navigate 126 the menu of functions 208 (FIG. 7) to allow the user to select a function. For example, if the user selects the delete function 126 as indicated by the lightning icon 208*a* (FIG. 7) the quick view entry (screen) indicated by the highlighted indicator icon 206*a* is removed from the list of quick view screens 128 and operation proceeds back to the start of the quick view routine 100. If another function is selected 126, the action indicated by the menu icon selected is performed 130 and operation returns to the start of the quick view mode 100.

Thus, it can be seen that a selective call receiver operated in accordance with the present invention allows the user to view preselected quick view screens in order to keep apprised of various information services. A preferred embodiment of the present invention allows selection of twenty (20) screens for quick view operation. When a user is not actively interacting with the multi function selective call receiver 30, the user can place the receiver into automatic quick view mode operation and the quick view controller 60 will cause the display of various preselected screens of interest to the user. These screens will be presented sequentially in a wrap-around manner such that each of the screens will be displayed until the user makes an appropriate key press 116 (FIG. 4) to exit from quick view operation.

Figure 8:
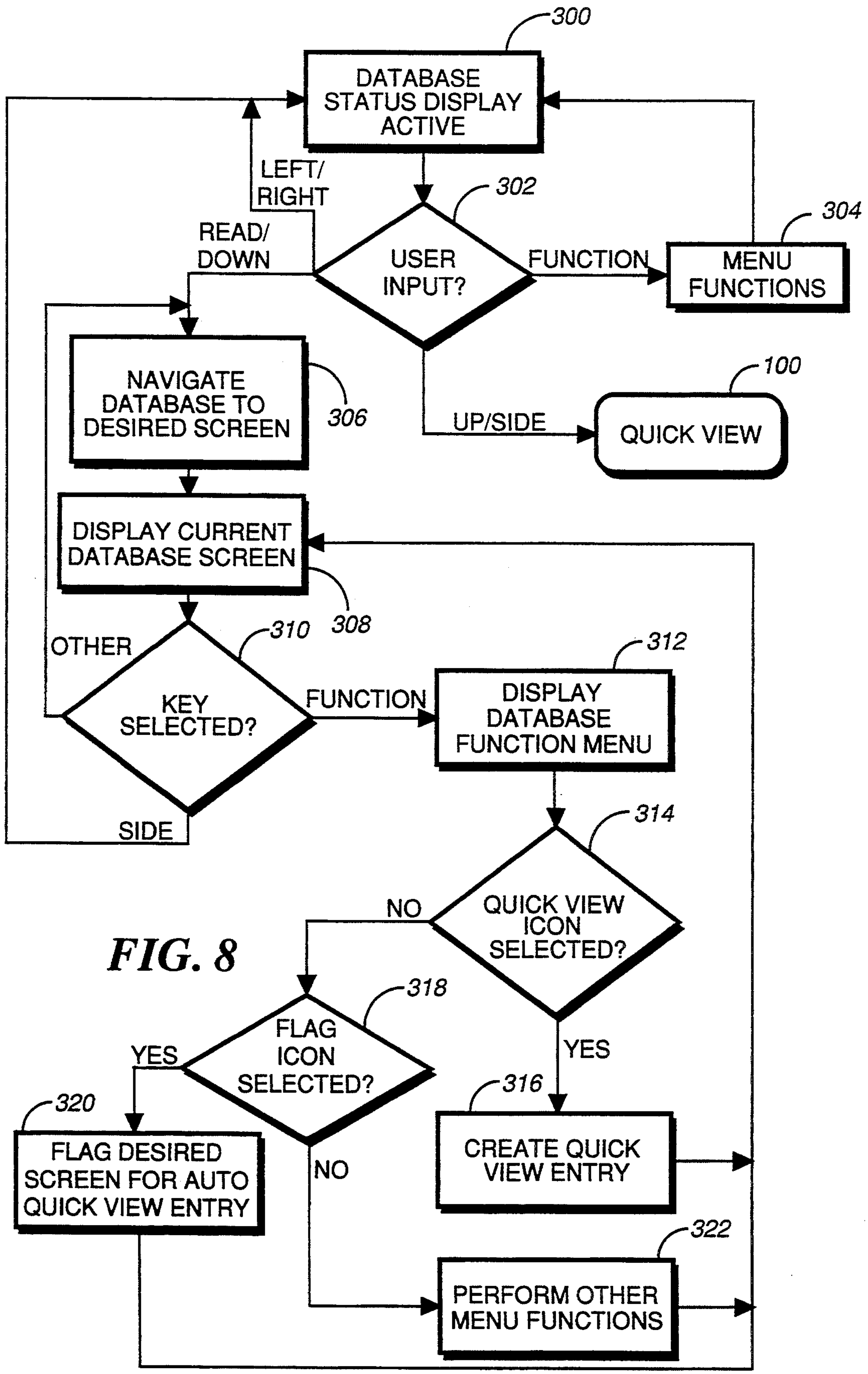
FIG. 8 is a flow chart of a quick view screen insertion operation by user selection and screen flag set operation of the information services pager of FIG. 2 in accordance with the preferred embodiment of the present invention.

Removal of screens from the quick view operation has been described 126, 128 (FIG. 5). Referring to FIG. 8, a flowchart of the operation of the manual insertion process whereby a database screen is user selected for quick view operation is shown. Initially, operation of the selective call receiver 30 (FIG. 2) is in the database operation mode wherein a database status display is active 300. The database status display is similar to the quick view status display shown in FIG. 6 wherein the indicator icons 206 indicate the number of databases active and a message personalized by the service provider indicates that operation is in the database mode.

User input 302 will allow for subsequent action. For example, the user may press a function key **40*b* (FIG. 7) and a menu of functions similar to that shown as menu 208 in FIG. 7 will be presented 304. Activation of the up cursor key 40*c* or the side key 40*g* will cause the controller 52 (FIG. 1) to pass control of the operation of the receiver 30 to the controller 60 for quick view operation 100. Activation of the left or right movement keys 40*e*, 40*f*, respectively, allows the user to move the cursor left or right through the database indicators 206** to select a database for quick viewing.

Activation of the down cursor key **40*d* or the exit key 40*a* from the database status display 300 will allow the user to navigate 306 to a desired database screen. The current screen is displayed 308 for user perusal until when the desired screen is displayed 308. Thereupon, the function key 40*b* (FIG. 7) may be activated 310 to cause display of a database function menu as shown in FIG. 3. Or if the user has selected an undesired database screen, and it is displayed 308, the user may activate 310 the side key 40*g* to return operation to display the database status screen 300. Activation 310 of any other key other than the side or function key 40*g* or 40*b*, respectively, returns to database operation to navigate to a different database screen 306**.

While the database function menu is displayed 312, the user may select any of the icons displayed by manipulation of the left and right cursor keys **40*e*, 40*f* and, when the appropriate icon is highlighted, activating the function key 40*b*. If the quick view icon 70*a* (FIG. 3) is selected 314, a quick view entry of the currently displayed database screen is created 316 and operation returns to display the current database screen without the function menu 308. If the quick view icon 70*a* (FIG. 3) is not selected 314, processing determines whether the flag icon 70*b* (FIG. 3) is selected 318**.

If the flag icon **70*b* is selected, the currently displayed database screen is flagged for auto quick view entry (i.e., auto entry into the list of quick view screens when updated) in accordance with the present invention as described hereinafter. Other menu functions may be performed 318 through appropriate selection of the other function icons 70 (FIG. 3). After performing the menu functions 318, operation returns to display the current database screen 308**.

Figure 9:
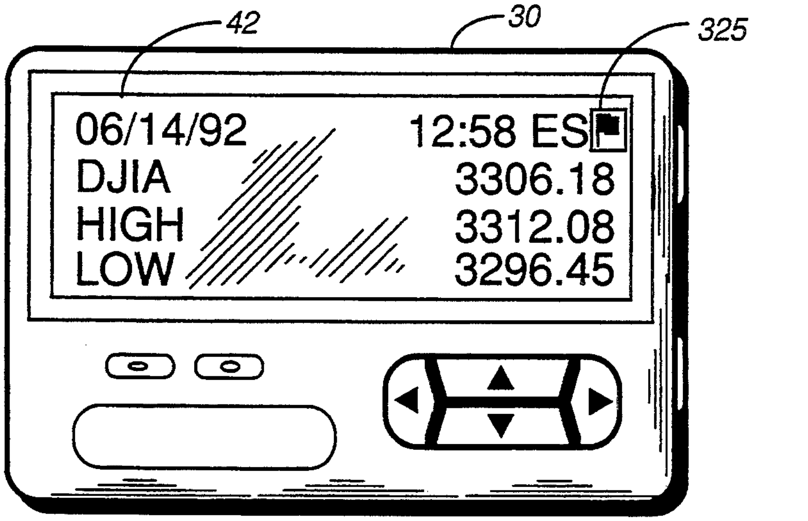
FIG. 9 is a planar view of the information services pager of FIG. 2 depicting a flagged screen of displayed information in accordance with the preferred embodiment of the present invention.

Referring to FIG. 9, flagging of the desired database for auto quick view entry changes the display such that a flag icon 325 is alternately displayed with the character in the upper right corner of the display 42 to indicate a flagged condition. Manual insertion of a database screen into quick view has been described with reference to FIG. 8. In accordance with the preferred embodiment of the present invention, automatic insertion of a database screen into quick view can be accomplished by a user flagging a particular database screen as described herein above or by a user triggering a numeric field of a database as described herein below. When an update is made via a received database message to a flagged screen or a triggered screen wherein the update causes the triggered field to be outside selected boundaries, the screen is automatically inserted as a screen for quick view operation.

Figure 10:
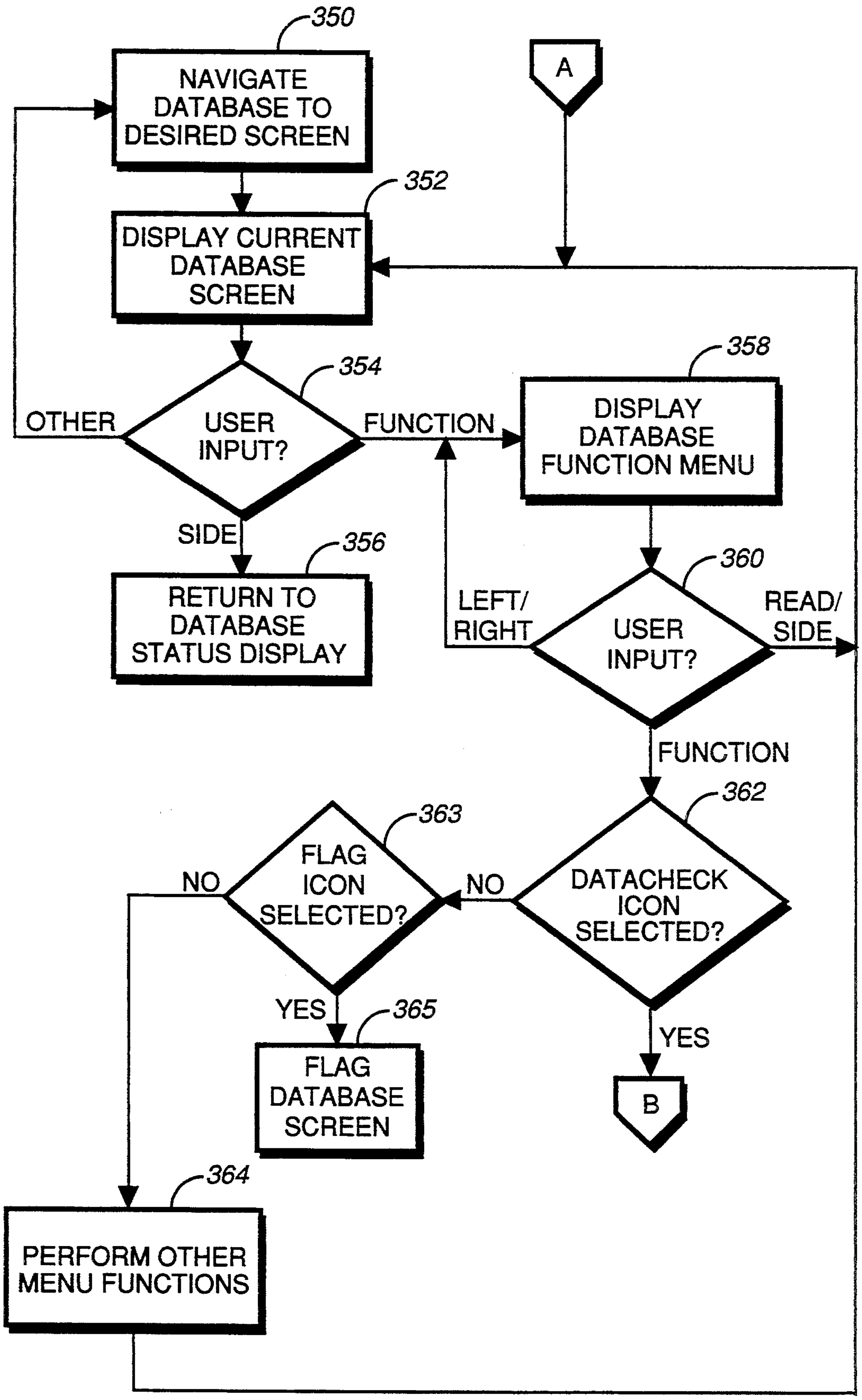
FIGS. 10, 11, and 12 are a flow chart of a screen trigger set operation of the information services pager of FIG. 2 in accordance with the preferred embodiment of the present invention.
Figure 11:
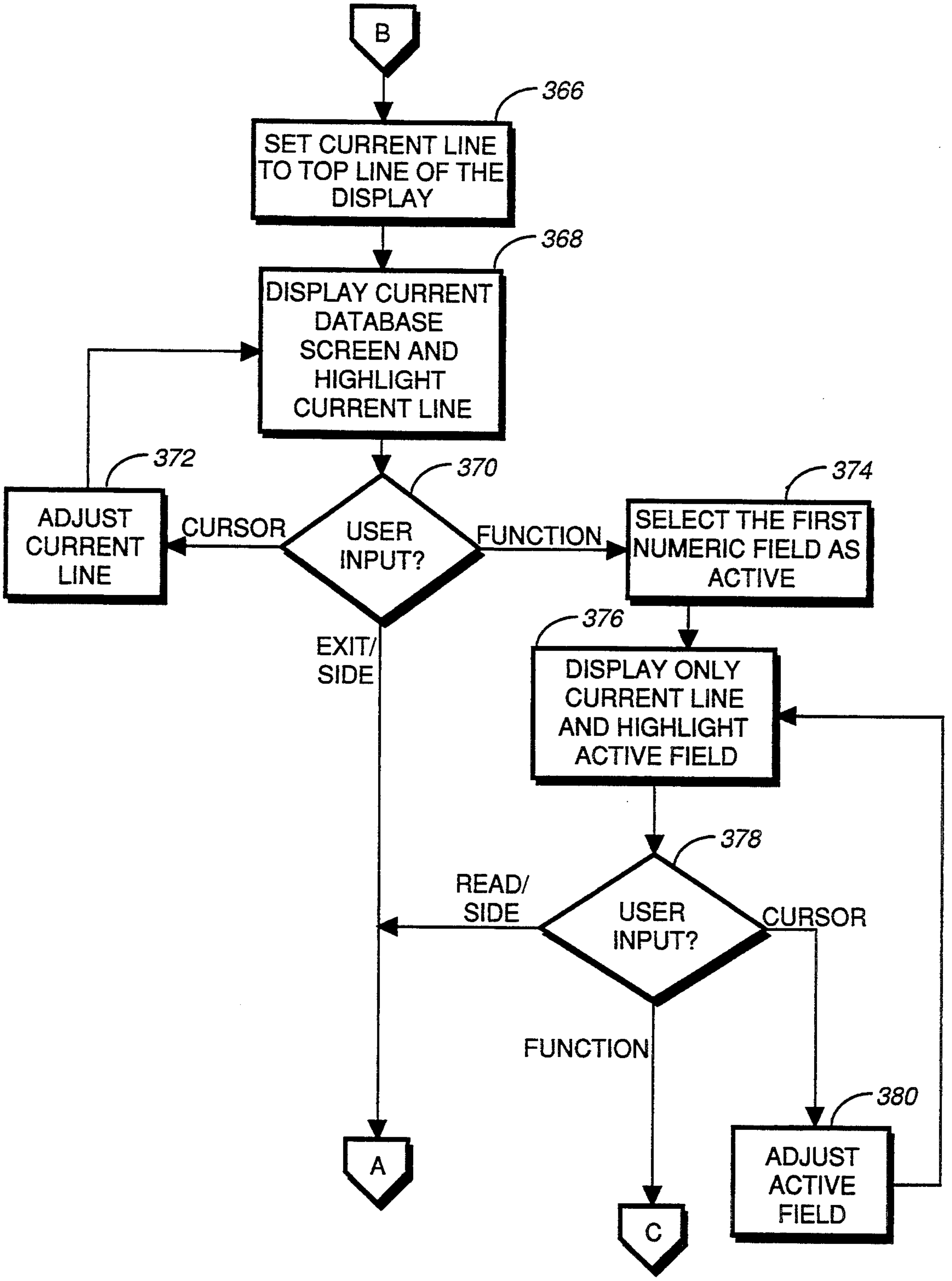
Figure 12:
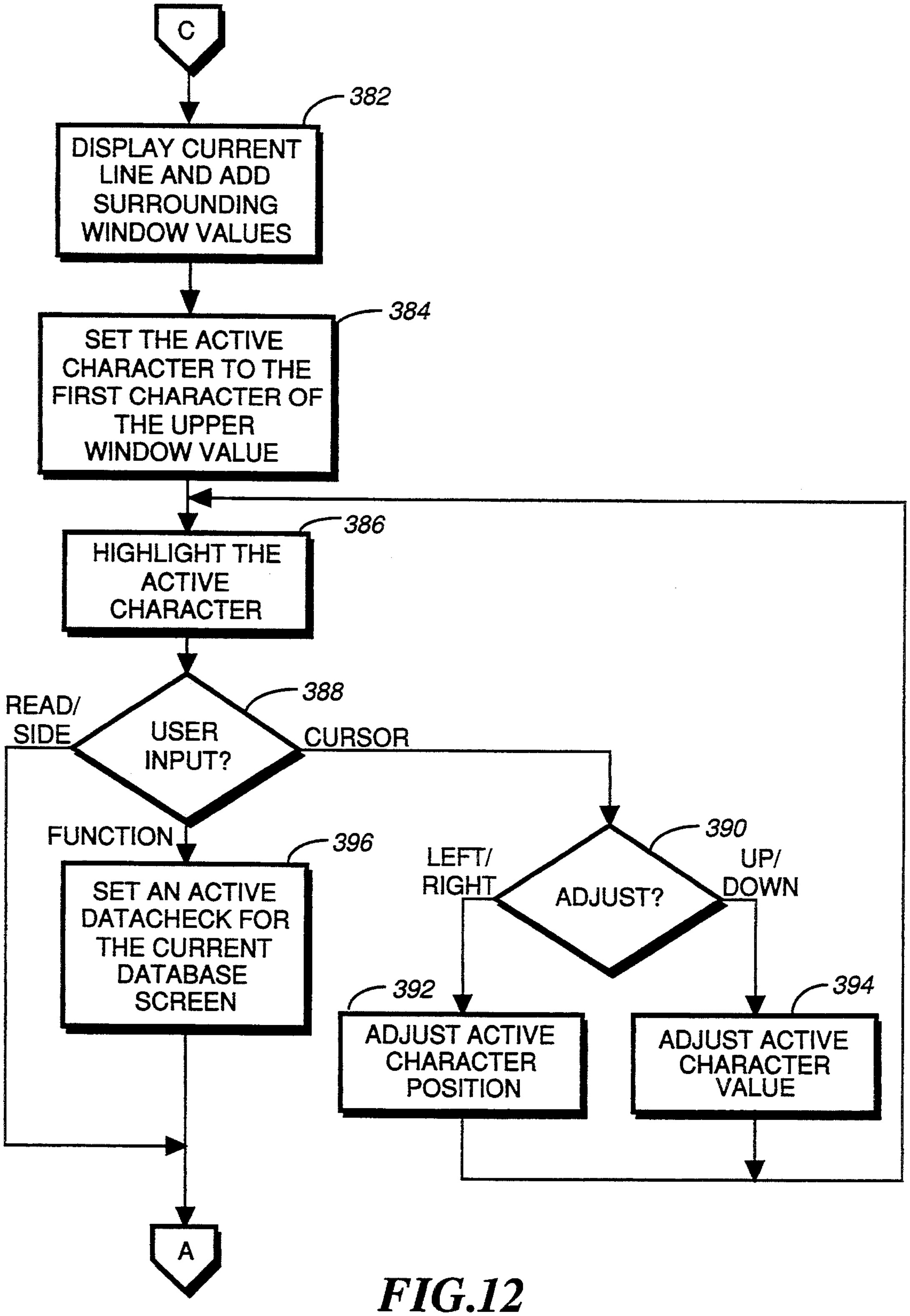

Referring to FIGS. 10, 11, and 12, a flow chart of the screen trigger set operation of a selective call receiver 30 of the preferred embodiment of the present invention begins when a user navigates through a database to a desired screen of information 350. The current screen is displayed 352 and processing awaits user input via one of the user controls **40*a*, 40*b*, 40*c*, 40*d*, 40*e*, 40*f* or 40*g* (FIG. 2). Activation of the side key 40*g* as a user input 354 returns processing to the database status display screen as previously described 356. Activation of the function key 40*b* displays 358 the database function menu 70 (FIG. 3) on the fourth line of the display 42. Activation of any other key for the user input 354 allows the user to navigate through the database 350**.

A user input 360, while the database function menu 70 is displayed, allows the user to select one of the functions offered by the function menu 70. Activation of the left and right cursor movement keys **40*e* and 40*f*, respectively, allows the user selectability of a function. As the cursor moves from one function icon to another function icon, the function icon is back highlighted to allow ease of choice. Activation of the exit key 40*a* or the side key 40*g* takes the user out of the function mode and displays the four lines of the current database screen 352**.

If the user input 360 is activation of the function key **40*b*, the user selects the highlighted icon. If the icon selected 362 is not the data check icon 70*c* or is not 363 the flag icon 70*b*, another function icon has been selected, and processing performs other menu functions 364 before returning to display the current database screen 352. If the flag icon 70*b* is selected 363, the current database is flagged 365 before returning to display the flagged screen as shown in FIG. 9**.

Figure 13:
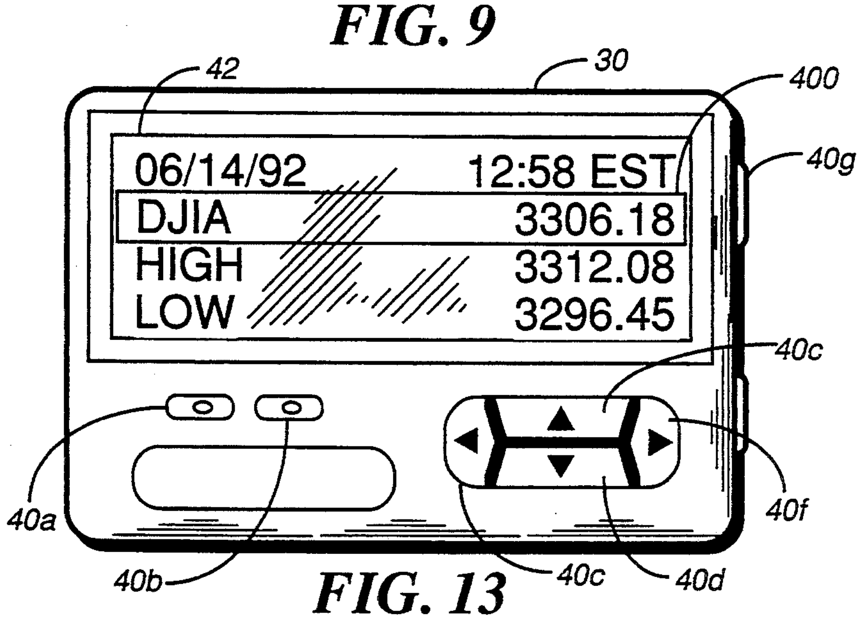
FIGS. 13, 14, 15 and 16 are planar views of the information services pager of FIG. 2 depicting screens of displayed information during the screen trigger set operation of FIGS. 10, 11, and 12 in accordance with the preferred embodiment of the present invention.

If the data check icon **70*c* is selected 362, a value for the current line is initially set to the top line of the display 366. Referring to FIG. 13, the user selects a current line 400 (as shown boxed) for triggering information. The chosen line, or the current line, contains a desired field for user selection. Referring back to FIG. 11, the current database screen is displayed and the current line is highlighted 368. In FIG. 13, for example, line 400, the second line of the display, is the current line and is therefore highlighted. A user input 370 of one of the cursor movement keys 40*c*, 40*d* allows the user to adjust the current line 372, and the database screen is again displayed with the adjusted current line highlighted 368. Activation of the exit key or side key 40*a*, 40*g* takes the user out of the trigger set routine, returning to display the current database screen without a highlighted current line 352**.

After choosing the appropriate line for triggering, the user activates 370 the function key **40*b* which initially selects the first numeric field on the line as the active field 374. The current line only is displayed with the active field highlighted 376. Activation of the cursor keys 40*d*, 40*e* as a user input 378 allows the user to adjust, or select, the active field desired 380. As the active field is adjusted 380**, the current line is displayed with the selected active field highlighted 376. Activation, at this time, of the exit key 40*a* or the side key 40*g* as a user input 378, takes the user out of the trigger set operation and returns to display the current screen 352.

Figure 14:
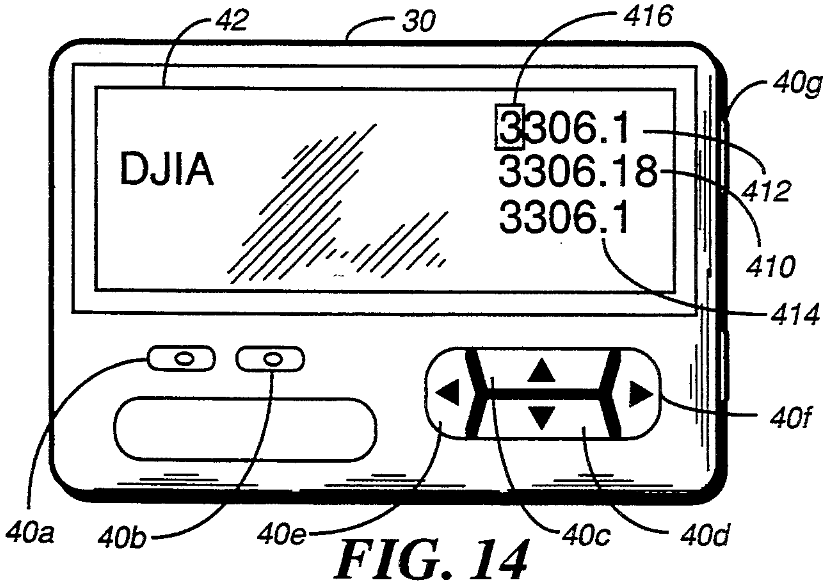

In accordance with the present invention, after the user selects the desired field 380 and that field is highlighted on the display 376, the user activates 378 the function key 40*b* which displays the current line while adding surrounding window values 382 and sets the active character initially to the first character of the upper window value 384. Referring to FIG. 14, the display 42 presents the current line of information "DJIA 3306.18" 410. The current line is surrounded with an upper window value 412 and a lower window value 414. The first character 416 of the upper window value 412 is the initial active character and is highlighted 386 (FIG. 12).

Figure 15:
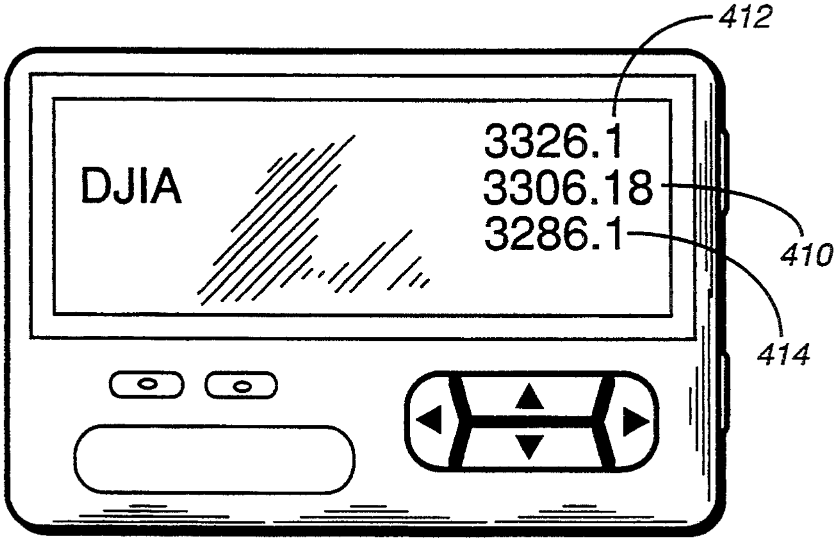
Figure 16:
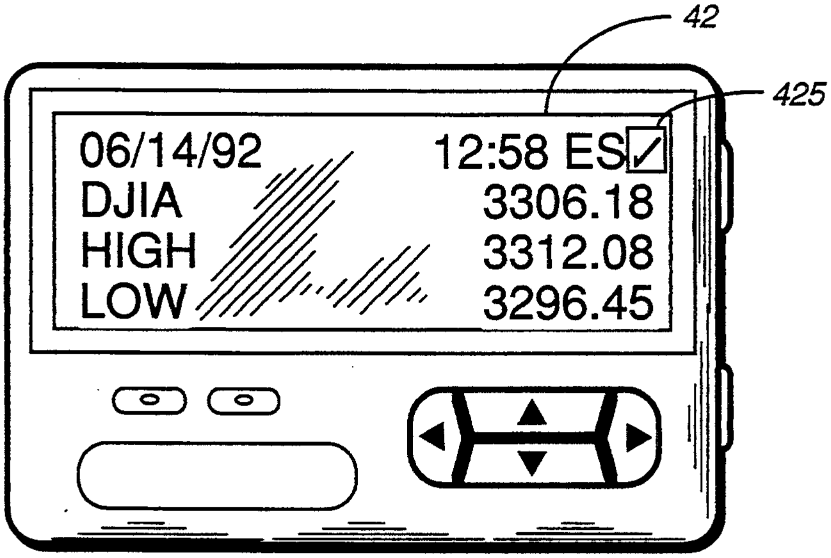

If a user input is received 388 involving activation of one of the cursor movement keys 40*b*, 40*d*, 40*e*, or 40*f*, an adjustment of the active character position or value is performed 390. If the cursor key activation involves activation of the left or right 40*e*, 40*f* keys, the active character position is adjusted 392 in the appropriate direction. If the up or down cursor keys 30*c*, 40*d* are activated 390, the value of the active character is adjusted 394 up or down in the appropriate direction. After adjustment of the active character position 392 or the active character value 394, processing returns to display the current line with the surrounding window values 384 highlighting the active character 386 as adjusted. When the user has completed adjustment of all the active character values 394, as shown in FIG. 15, activation of the function key 40*b* as a user input 388 sets an active data check for the current database screen 396. Processing returns to display the database screen 352 with a "check mark" icon 425 (FIG. 16) alternately displayed in the upper right corner of the display 42 with the original character located thereat.

Activation of the data check trigger values allows a user to bracket normal activity or predictable activity of a varying value such as a stock market quotation or a baseball score. When an update is received for an active data check screen which causes the active numeric field value to become greater than the upper window value or less than the lower window value, the user is alerted and the screen is automatically inserted into the quick view operation. Thus, when movement of a stock reaches a range of interest to the user, the user will be notified by alert generation and will be able to view the stock quotation in the quick view mode without tedious manipulation of user controls to select the appropriate screen. An alternate embodiment of the present invention could allow triggering of data fields comprising non-numeric data, such as alphanumeric data. If an update is not equivalent to the triggers stored, then the user will be alerted.

Figure 17:
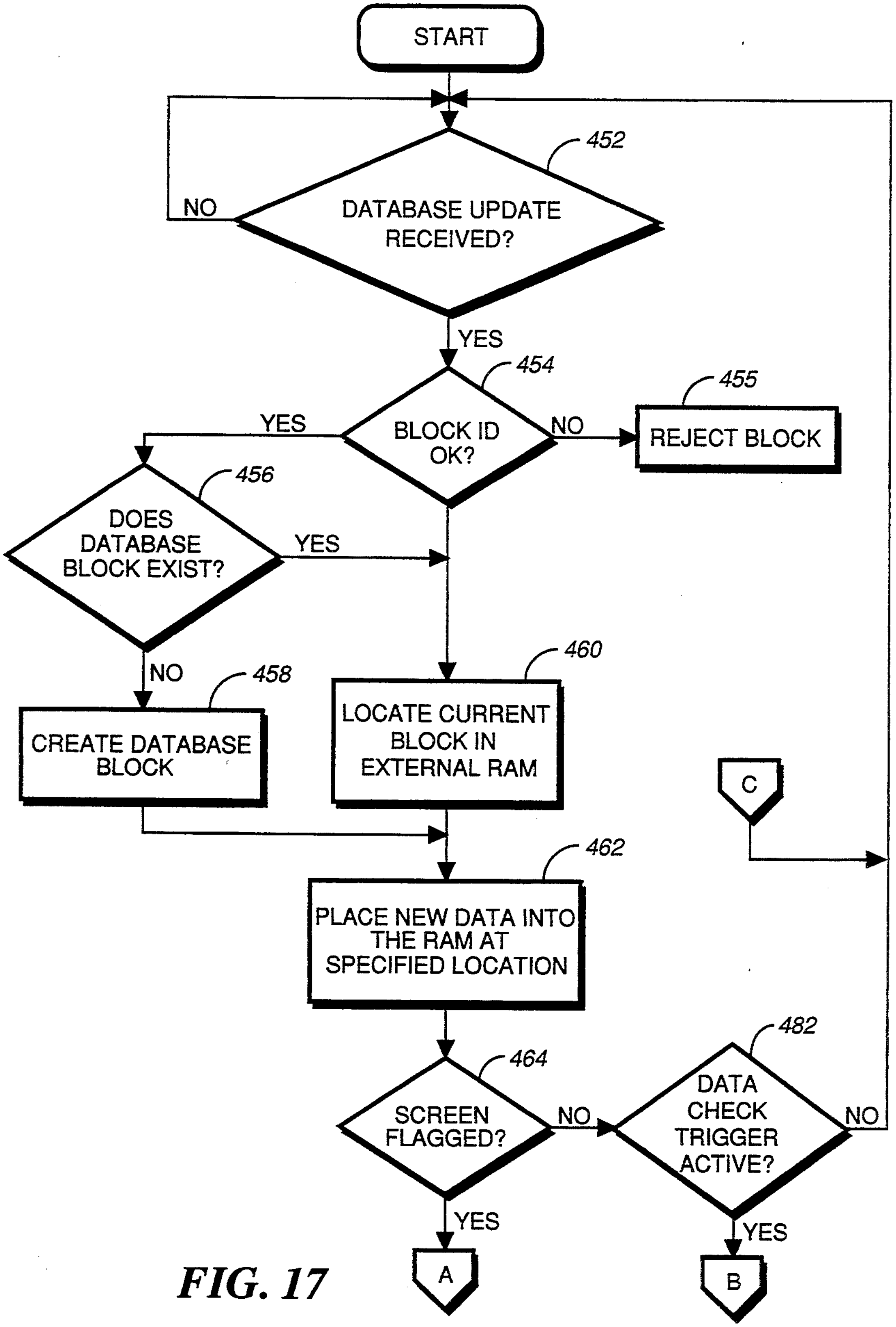
FIGS. 17 and 18 is a flow chart of a quick view auto insert mode of operation of the information services receiver of FIG. 2 upon receipt of database selective call messages in accordance with the preferred embodiment of the present invention.
Figure 18:
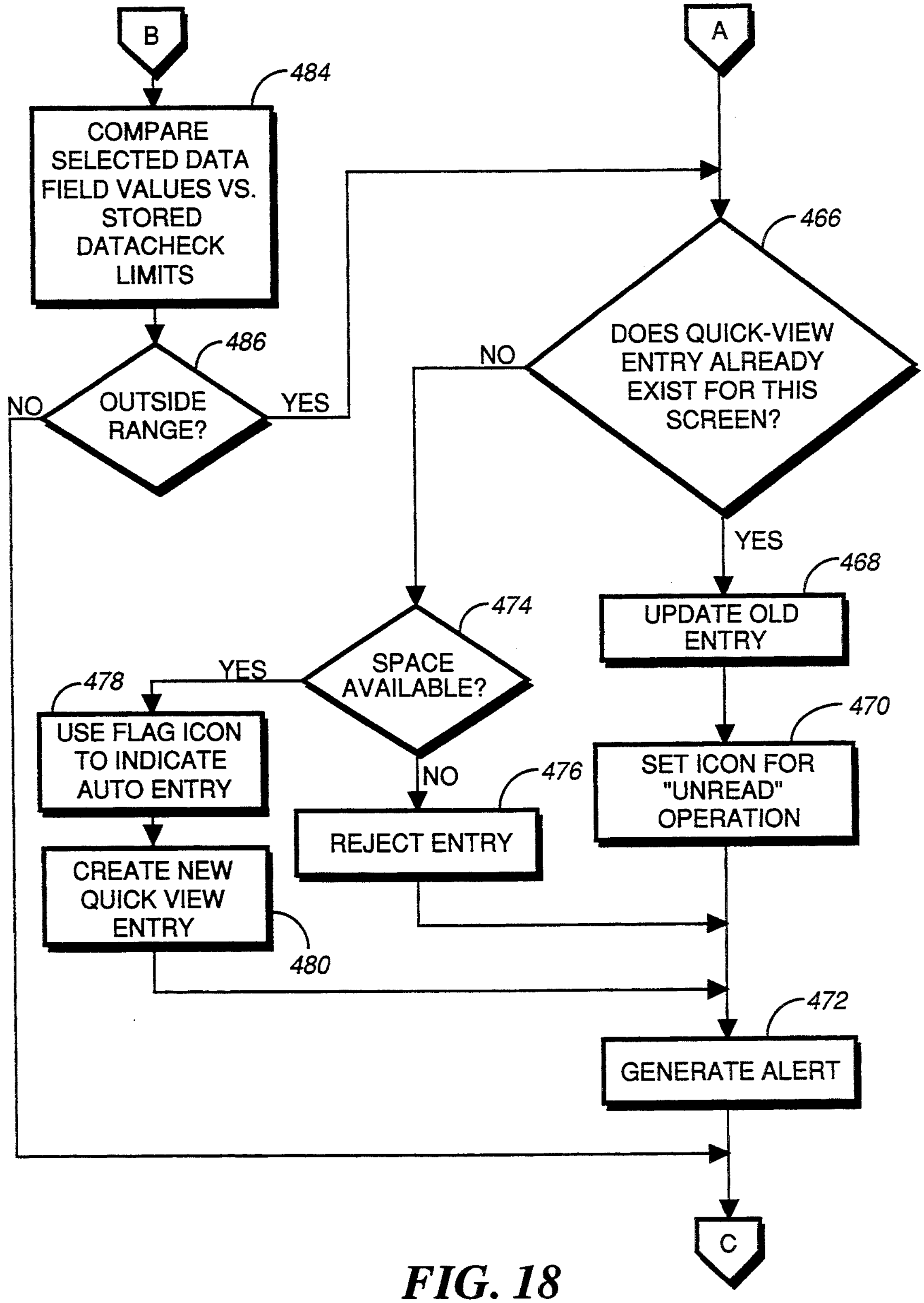

The automatic quick view entry operation of the controller 52 (FIG. 1) in accordance with the preferred embodiment of the present invention is shown in FIGS. 17 and 18. After processing starts 450, the controller 52 awaits reception of a database update message 452. When the database block is received 452, the block is examined to see if the block identification is appropriate 454. The user may subscribe to various databases and, when the database blocks arrive, they are associated with an address identifying the database in a manner known to those skilled in the art. If the address is not an active address for the selective call receiver 454 (i.e., a block identification is not correct) the database block is rejected 456 and processing returns to await reception of a next database block 452.

If the database block identification is acceptable 454, the controller 52 examines the database portion 48 of the RAM 44 (FIG. 1) to determine 456 whether a database corresponding to the database block received exists in the memory 46. If the database block does not exist 456 in RAM 44, a database block is created 458 in accordance with the received database block. If the database block does exist in memory 456, the location of the currently stored database block in the RAM 44 is found 460 and the new data received is placed into the RAM 44 at the location specified 462 by the database block information received.

In accordance with the present invention, the screen in which the new data is entered 462 is examined to determine if the screen has been flagged 464 by the user. If the screen is flagged 464 when an update is received, the quick view screens are examined 466 to determine if an entry for the flagged screen already exists in quick view. If the flagged screen is already inserted into quick view 466, the old entry of the quick view screen is updated 468, the icon on the quick view standby screen 206 (FIG. 6) is set for "unread" operation 470, and an alert is generated 472. The alert notifies the user that an update has occurred to a quick view screen and can be a different alert than the conventional alert reception of personal messages. After the alert is generated 472, processing by the controller 52 (FIG. 1) of received information returns to await reception of a next database block 452.

If a screen has been flagged 464, but a quick view entry does not exist for the screen 466, the number of screens in quick view are examined 474 to determine if space is available for addition of a new quick view screen. If no space is available 474, the flagged screen is rejected entry into quick view 476 but the user is nevertheless alerted 472 to notify that an update of a flagged screen has occurred.

If space is available in quick view for addition of another screen 474, the flag icon 206*d* (FIG. 6) is displayed on the quick view status screen to indicate that an auto entry insertion of a screen has occurred 478 in accordance with the present invention. The updated screen is added as a new entry to quick view 480 and the user alert is generated 472. Processing then returns to await reception of the next database block 452. The updated screen is added as a new entry to quick view 480 and the user alert is generated 472. Processing then returns to await reception of the next database block 452.

In accordance with a further feature of the present invention, if the screen being updated is not flagged 464 but a data check trigger is activated for the screen 482, the updated value of the selected data field is compared to the stored data check limits 484 to determine 486 whether the updated values are within or outside the range set by the data check limit. If the updated value is within the range of the stored limit 486, the increase or decrease in the value is of no interest to the user so the alert is not generated and the screen is not stored into quick view. Instead, processing returns to await reception of the next database block received 452.

If, on the other hand, the updated values are outside the data check ranges 486, processing proceeds to insert the screen into quick view in the same manner as a flagged screen update is inserted therein. If the triggered screen is already in quick view 466, the old entry is updated 468, the icon for "unread" operation is set 470, and an alert is generated 472 before processing returns to step 452 to await reception of the next database block. If the triggered screen is not in quick view 466 and space is available 474, the flagged icon is used to indicate auto entry of a screen into quick view 478 and a new quick view entry is created 480 for the updated screen. The user alert is generated 472 and processing returns to await the next database block received. Finally, if the data check limits are exceeded by the updated values 486, and no quick view screen exists for the updated triggered screen 466, and if there is no space available 474 in quick view for an additional screen, entry of the triggered screen into quick view is rejected 476. The user, however, is notified by generation of an alert 472 before processing returns to await the next database block received 452.

By now it should be appreciated there has been provided a method and apparatus for notifying the user of selected updates of information and allowing the user a quick access to the screen or screens of updated information. In one contemplated mode of operation, the user can select various triggers and flags, place the selective call receiver into a charger on his desk, and place the selective call receiver into quick view operation mode. When any information of interest to the user is received, the user is alerted and can view the information automatically as it is displayed in the quick view screens. Stock quotations are particularly suited to the trigger feature of the present invention. Additionally, news stories of interest to a user are particularly suited for flagging in accordance with the present invention. Thus, when a stock quotation value falls outside the preselected limits set by the user or when a news story is updated with more information, the user will be notified and can quickly and easily view the updated information.

What is claimed is:

1. A method for displaying information in a selective call receiver for receiving messages which update databases that have been previously stored, wherein the databases comprise a plurality of screens of information, the method comprising the steps of:

(a) receiving a selective call message comprising update information and database information, wherein the database information specifies a database and a location within the specified database for storage of the update information;

(b) updating a portion of the specified database in response to the update information;

(c) determining whether a screen of information that includes the updated portion of the specified database has been previously flagged by a user to indicate that the screen is of special interest;

(d) adding, in response to step (c), the screen to a list of screens of special interest to the user if the screen has been flagged; and (e) user activating, subsequent to step (d), a quick view mode of operation, wherein the list of screens, including, if it has been flagged, the screen that includes the updated portion, is accessible by a user in the quick view mode of operation in response to a fewer number of user activations of user keys than are required for the display of other screens that are not included in the list of screens.

2. The method of claim 1 wherein each of the plurality of screens comprises at least one field and wherein step (b) comprises the step of (f) updating one of the at least one field, and wherein step (c) comprises the step of (g) determining whether the one of the at least one field updated has been user selectably triggered with trigger information and the update information comprises number information outside a range defined by the trigger information, and wherein step (d) comprises the step of (h) adding the screen to a list of screens if the one of the at least one field updated has been user selectably triggered with trigger information and the update information comprises numeric information outside a range defined by the trigger information.

3. A selective call receiver for receiving selective call messages, the selective call receiver comprising:

receiving means for receiving selective call messages comprising update messages;

memory means for storing a plurality of screens of information included in databases;

user input means for receiving input signals from a plurality of user keys in response to user activation thereof;

display means for displaying the plurality of screens to a user;

first control means coupled to the memory means and the display means for maintaining a list of screens comprising user selected ones of the plurality of screens, wherein a chosen screen is provided to the display means for display thereby in response to a first number of user activations of the user keys if the chosen screen is on the list of screens, and wherein the chosen screen is provided to the display means for display thereby in response to a second number of user activations of the user keys if the chosen screen is not included in the list of screens, wherein the first number is less than the second number; and second control means for maintaining the plurality of screens comprising:

flagging means coupled to the user input means for flagging one of the plurality of screens in response to user activation of the user keys;

updating means for updating the plurality of screens in response to the update messages;

first determining means for determining whether an update message updates a flagged one of the plurality of screens; and signalling means coupled to the first control means for signalling the first control means to add an updated one of the plurality of screens to the list of screens if the first determining means determines that the updated one of the plurality of screens is a flagged one of the plurality of screens.

4. The selective call receiver of claim 3 wherein each of the plurality of screens comprises at least one field and wherein the updating means further comprises field updating means for updating one of the at least one field in response to the update information, and wherein the second control means further comprises:

triggering means coupled to the user input means for triggering one of the at least one field of the plurality of screens by user selectably inputting trigger information for defining a range; and second determining means for determining whether an update message updates a triggered one of the at least one field of one of the plurality of screens and for determining whether the update information comprises numeric information outside the range defined by the inputted trigger information, and wherein the signalling means signals the first control means to add an updated one of the plurality of screens to the list of screens if one of the at least one field of the one of the plurality of screens updated has been user selectably triggered with the trigger information and the update information comprises numeric information outside the range defined by the trigger information.

5. The method of claim 1, further comprising the step of (i) generating a sensible alert to announce reception of the selective call message only when the screen is included in the list of screens.

6. The method of claim 1, wherein step (e) comprises the step of (j) user activating, subsequent to step (d), a quick view mode of operation, wherein each of the list of screens is immediately and directly accessible without navigating through each database which includes each respective screen included in the list of screens.

7. The method of claim 1, further comprising the step of (k) displaying the screen that includes the updated portion of the database in response to a user input, wherein step (k) comprises the steps of:

(l) user activating the quick view mode of operation, when the screen has been added to the list of screens, such that the screen is immediately and directly accessible for display; and (m) navigating through the database, when the screen has not been added to the list of screens, to first locate then display the screen.

8. The selective call receiver of claim 1, wherein step (e) comprises the step of (n) user activating, subsequent to step (d), a quick view mode of operation, wherein the list of screens, including the screen that includes the updated portion if it has been flagged, is immediately and directly accessible by a user in the quick view mode of operation, and wherein each screen included in the list of screens is automatically displayed in succession for a predetermined amount of time in response to a predetermined user input.

9. The selective call receiver of claim 3, further comprising:

alerting means coupled to the first control means for generating a sensible alert in response to a received message only when a screen updated responsive to the received message is included in the list of screens.

10. The selective call receiver of claim 3, wherein the first control means comprises means for automatically providing each screen included in the list of screens to the display means in succession for a predetermined amount of time in response to a predetermined user input.

11. A selective call receiver for receiving selective call messages, for storing databases including a plurality of screens, and for receiving inputs via user keys, the selective call receiver comprising:

receiving means for receiving a selective call message comprising update information and database information, wherein the database information specifies a database and a location within the database for storage of the update information;

updating means for updating a portion of the specified database in response to the update information;

flagging means for receiving signals by which a user flag is a screen to indicate that the screen is of interest;

determining means for determining whether a screen of information that includes the updated portion of the specified database has been previously flagged by a user;

means for generating a list of screens of special interest and for adding the screen to the list of screens if the screen has been flagged; and control means for user activating a quick view mode of operation, wherein each of the list of screens, including, if it has been flagged, the screen that includes the updated portion, is accessible by a user in the quick view mode of operation in response to a fewer number of user activations of user keys than are required for the display of other screens that are not included in the list of screens.

12. The selective call receiver of claim 11, further comprising:

display means for displaying information; and display driving means for automatically providing, in response to a predetermined user input, each of the list of screens to the display means successively for a predetermined amount of time while in the quick view mode of operation.

13. A method for displaying information in a selective call receiver, the method comprising the steps of:

(a) receiving a user input indicative of a screen included in a stored database, wherein the stored database includes a plurality of screens;

(b) flagging the screen to indicate that the screen is of special interest to the user;

(c) receiving, subsequent to step (b), a selective call message comprising database information and update information, wherein the database information is indicative of at least a portion of the screen of the stored database;

(d) updating the at least a portion of the screen with the update information in response to step (c); and (e) automatically adding, subsequent to step (d), the screen to a list of screens in memory;

(f) user activating a quick view mode of operation wherein each screen included in the list of screens is displayed in response to a fewer number of user activations of user keys than are required for the display of other screens that are not included in the list of screens.

14. The method of claim 13, further comprising the step of:

(g) generating, in response to step (d), a sensible alert to announce the updating of the at least a portion of the screen of special interest.

15. The method of claim 14, wherein step (f) comprises the step of:

(h) user activating a quick view mode of operation wherein each screen included in the list of screens is, in response to a minimal number of user activations of user keys, successively and automatically displayed for a predetermined amount of time.

* * * * *

UNITED STATES PATENT AND TRADEMARK OFFICE

CERTIFICATE OF CORRECTION

PATENT NO. : 5,426,422

DATED : June 20, 1995

INVENTOR(S) : Dean P. Vanden Heuvel

It is certified that error appears in the above-indentified patent and that said Letters Patent is hereby corrected as shown below:

Column 14, Line 6, delete "flag is" and insert --flags--.

Signed and Sealed this

Twenty-first Day of November, 1995

Attest:

BRUCE LEHMAN

*Attesting Officer* *Commissioner of Patents and Trademarks*